April 9, 1946.    S. DU PONT    2,398,211
SPRING SUSPENSION FOR SADDLES
Filed June 26, 1944
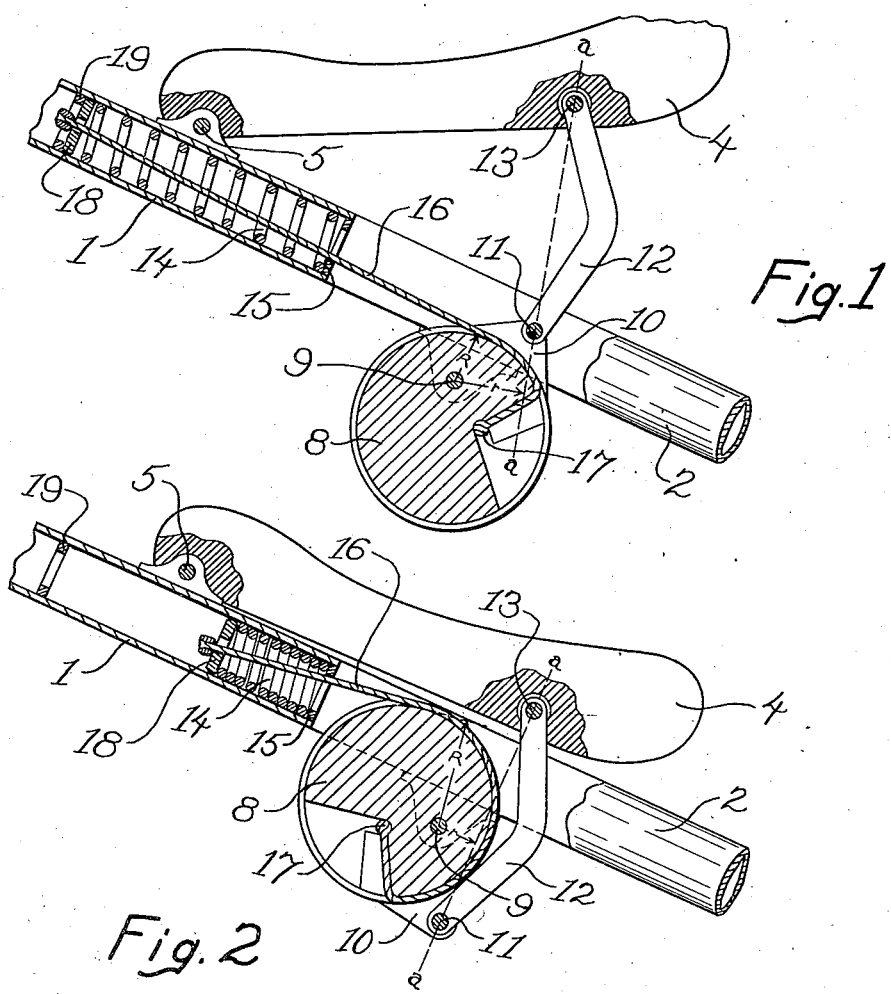
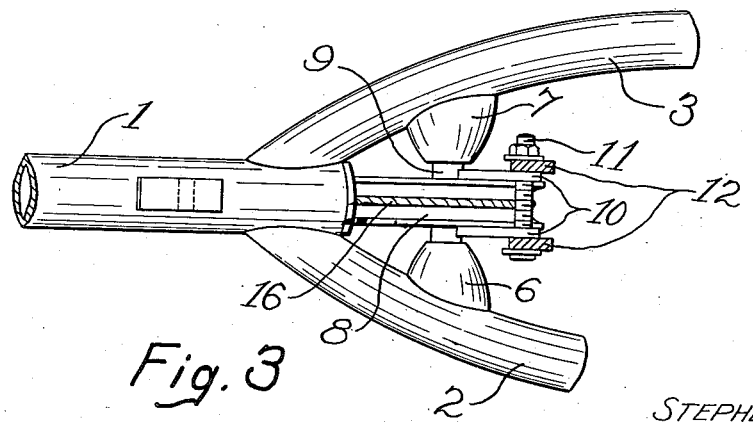
INVENTOR
STEPHEN DU PONT
BY Chapin & Neal
ATTORNEYS Patented Apr. 9, 1946

2,398,211

UNITED STATES PATENT OFFICE 2,398,211

SPRING SUSPENSION FOR SADDLES

Stephen du Pont, Wilbraham, Mass., assignor to Indian Motocycle Company, Springfield, Mass., a corporation of Massachusetts Application June 26, 1944, Serial No. 542,091

4 Claims. (Cl. 155—5.20)

This invention relates to a spring suspension for a load carrying member and in the embodiment hereinafter described is more particularly adapted for the resilient support of a saddle on a motorcycle frame.

An object of the invention is to provide such a spring suspension for the saddle as will offer a variable resistance in carrying the load on the saddle during its downward stroke. The spring suspension herein is designed to act with a relatively heavy resistance during the initial part of the saddle stroke downward for effectively carrying the load, and to act with less resistance during the intermediate portion of the downward stroke to provide soft riding, and finally to act with greatly increased resistance toward the end of said downward stroke in preventing the saddle from striking bottom.

A feature of the invention also resides in the compact arrangement and organization of parts whereby a structure of great simplicity and at relatively low cost may be obtained. Further objects and advantages of the invention will become apparent from the following detailed description taken in connection with the accompanying drawing which shows a preferred embodiment of the invention and in which:

Fig. 1 is a side view of a rear part of a bicycle frame partly in section showing the saddle mounted thereon in its fully raised position;

Fig. 2 is a similar view with the saddle in its fully depressed position; and

Fig. 3 is a detail plan with the saddle removed to show the mounting of the parts.

Referring more particularly to the drawing the main top tubular bar of a motorcycle frame is indicated at 1. Branching out from the rear end of this bar 1 are the separated bars 2 and 3 of the rear fork of the frame. The saddle indicated at 4 is pivotally mounted at its forward end on the main bar 1 at the pivot 5 whereby the rear portion of the saddle may have an up and down movement thereon. Pivotally mounted on trunnion bearings 6 and 7 between the rear fork bars 2 and 3, as shown in Fig. 3, is a rocking cam member 8. This cam member acts as a windup cam for a cable and is preferably in the form of a grooved pulley wheel adapted to have its rocking movement about an eccentric pivotal mounting at 9 in said trunnion bearings therefrom, as shown in Fig. 1. Formed integrally or as a fastened part of said pulley 8 is a bifurcated crank arm 10 in the outer end of which is pivotally connected at 11 a link 12 preferably of bell-crank shape as shown. The upper end of said connecting link 12 is pivoted at 13 to the saddle 4.

Housed in the tubular bar 1 of the frame is a coil compression spring 14 which at its rear end is held in position within the tube by a suitable snap ring 15 set against stop lugs at the end of said tube 1. A flexible cable 16 anchored at one end 17 on the pulley 8 is wrapped partway over the peripheral groove thereof and extends forwardly as shown through the coil spring 14 where it is secured to a spring collar 18 abutting the forward end of the spring 14. The collar 18 is freely slidable within the tube 1 for compressing the spring and is limited in its forward movement by a stop shoulder 19 formed in the tube bar 1.

The operation of the spring suspension for the saddle is as follows:

The tension of the coil spring 14 tends to hold the collar 18 at the forward limit of its travel which through its connected cable 16 on the windup cam 8, holds the saddle in its uppermost position as shown in Fig. 1. When the saddle is loaded, a downward thrust occurs along the dotted line $a$—$a$ through pivots 11 and 13 and the mechanical leverage of this thrust upon the pulley 8 is indicated by radius $r$. The leverage of the cam pulley 8 upon its windup cable 16 is indicated by radius $R$. As the saddle moves downward in its stroke, it will be obvious that the radius $r$ at first increases rapidly while the radius $R$ increases slowly. In the intermediate part of the downward stroke of the saddle the greatest mechanical leverage is obtained for the compression of the coil spring 14. This produces easy and soft riding on the saddle during its normal range at the intermediate part of its down stroke. As the saddle near the lower end of its stroke the radius $r$ rapidly decreases and the radius $R$ is rapidly increasing. This combined effect gives the coil spring 14 its greatest resisting power for holding the saddle from striking bottom. The change of leverage just described for the lower part of the saddle stroke is assisted in its action by the additional compression of the spring 14 as shown in Fig. 2.

The cable acts on the spring and the force on the cable is governed by standard straight line spring rate which means that the load on the spring is proportional to its deflection. This is explained in mechanics as Hooke's law. The radius $R$ holds a relationship to the radius $r$. This relationship determines the mechanical advantage or leverage between the saddle connecting rod and the spring. Thus, when $r$ is great and R is small, it is easy to deflect the saddle top. When $r$ is small and R is great, it is difficult to depress the saddle top. R can be varied by the contour of the cam 8. $r$ is varied by the position of the saddle top, and in the preferred arrangement, starts out as a relatively large radius; and, as the saddle approaches the bottom of its travel, the radius gets extremely small providing a desired rapid loss of mechanical advantage. Although the drawing shows the cam 8 as an eccentric circle, the contour of cam 8 can be so designed as to get any desired change in R.

The arrangement and design of the parts allows complete choice of the effective spring rate as transferred from the vehicle frame to the saddle during any part of the travel of the saddle. Thus, it is possible to attain a rapid build-up in spring load towards the bottom of the travel to prevent unpleasant jarring when the saddle has reached its extreme travel. Likewise, part of the travel that is used for normal riding deflections can be a fairly low spring rate to give an easy ride. Starting spring rates can likewise be controlled independently of the remainder of the travel.

I claim:

1. In a spring suspension for a load carrying member, a frame, said load member mounted for up and down movement on said frame, a spring positioned for supporting said load member, variably acting leverage means for stressing said spring during a down movement of said load member comprising a windup member pivotally mounted on said frame, a flexible cable extending from said spring for a windup action on said windup member when rocked in one direction and for an unwinding action thereon when said windup member is rocked in the other direction, and means connecting said windup member to said load member for rocking said windup member back and forth on its pivotal mounting, operated by the up and down movement of said load member.

2. In a spring suspension for a load carrying member, a frame, said load member mounted for up and down movement on said frame, a spring positioned for supporting said load member, variably acting leverage means for stressing said spring during a down movement of said load member comprising a pivotally mounted windup cam, a flexible cable extending from said spring for a windup action on said cam when rocked in one direction and for an unwinding action thereon when said cam is rocked in the other direction, means for rocking said cam back and forth on its pivotal mounting operated by the up and down movement of said load member, comprising a crank on said cam, a link pivotally connected at one end to said crank and haivng a pivotal mounting at its other end, one of the aforesaid pivotal mountings being on said load member, the other pivotal mounting being on said frame.

3. In a spring suspension for a load carrying member, a frame, said load member mounted for up and down movement on said frame, a spring carried on said frame for supporting said load member, variably acting leverage means for stressing said spring during a down movement of said load member, comprising a windup cam pivotally mounted on said frame, a flexible cable extending from said spring for a windup action on said cam when rocked in one direction and for an unwinding action thereon when said cam is rocked in the other direction, and means for rocking said cam back and forth on its pivotal mounting operated by the up and down movement of said load member comprising a crank on said cam and a link having one end pivotally connected to said crank and the other end pivotally connected to said load member.

4. In a spring suspension for saddles and the like, a motorcycle frame comprising a tubular top bar and separated rear fork bars, a saddle pivoted at its forward end to said frame for up and down movement, a coil spring housed in the tubular bar of said frame, variably acting leverage means for stressing said spring during a down movement of said saddle comprising a windup cam pivotally mounted between the separated rear fork bars of said frame, a flexible cable extending from said spring for a windup action on said cam when rocked in one direction and for an unwinding action thereon when said cam is rocked in the other direction, and means for rocking said cam back and forth on its pivotal mounting operated by the up and down movement of said saddle comprising a crank on said cam and a link pivotally connected at one end to said crank and at its other end to a rear portion of said saddle.

STEPHEN DU PONT.